No. 842,575. PATENTED JAN. 29, 1907.
M. F. McMAHON.
SELF RETAINING ADJUSTING MEANS FOR CLUTCH ACTUATING DRAFT BOLTS.
APPLICATION FILED MAY 9, 1906.
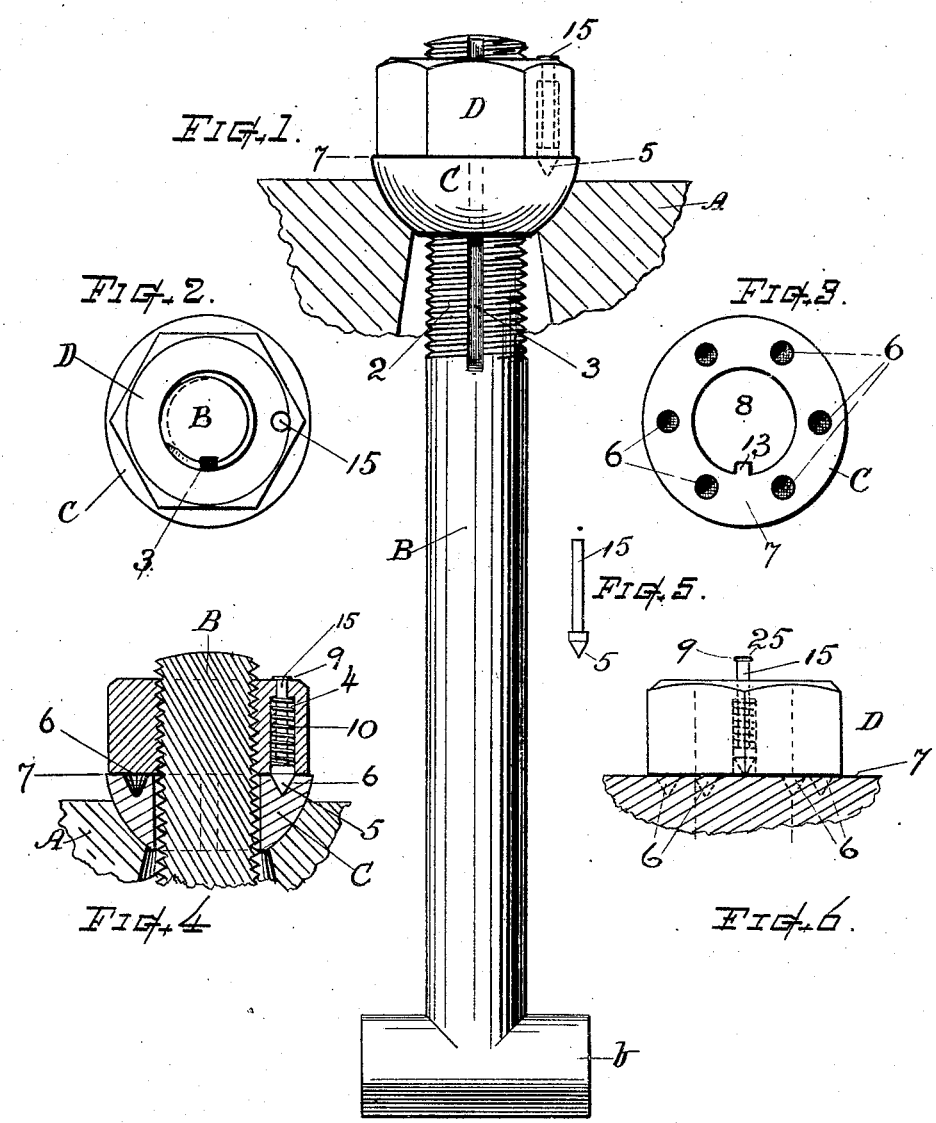

UNITED STATES PATENT OFFICE.

MICHAEL F. McMAHON, OF WORCESTER, MASSACHUSETTS.

SELF-RETAINING ADJUSTING MEANS FOR CLUTCH-ACTUATING DRAFT-BOLTS.

No. 842,575.     Specification of Letters Patent.     Patented Jan. 29, 1907.

Application filed May 9, 1906. Serial No. 315,920.

*To all whom it may concern:*

Be it known that I, MICHAEL F. MCMAHON, a citizen of the United States, residing at Worcester, in the county of Worcester and State of Massachusetts, have invented a new and useful Self-Retaining Adjusting Means for Clutch-Actuating Draft-Bolts, of which the following is a specification, reference being made therein to the accompanying drawings.

The object of my present invention is to provide a simple and efficient means for the automatic retention at predetermined positions of adjustment of the adjusting-nuts upon the draft-bolts of frictional clutch mechanisms and mechanism in which a fine, positive, and reliable adjustment and sure retention of such adjustment is required; also to provide a means for the purpose named that will be self-acting and will not interfere with the use of a wrench upon the nut or the ready adjustment of the nut at any time and which will in its action indicate the degree of adjustment being made by the movement of the nut. These objects I attain by a mechanism the parts of which are constructed and combined to operate in the peculiar manner hereinafter explained and illustrated by the drawings, wherein—

Figure 1 represents a side view of a draft-bolt and adjusting devices embodying my invention. Fig. 2 is an end view of the same. Fig. 3 represents the seat, face, or member against which the nut rests. Fig. 4 is a central longitudinal section through the nut and end of the bolt. Fig. 5 is a separate side view of the cone-pointed retaining-pin, and Fig. 6 shows the position of the pin while the nut is being turned from one position to another.

According to my invention the nut is provided at one side with a spring-pressed pin or stud having a conical-shaped point that normally projects from the bearing-face of the nut and engages with one of a series of recesses formed in circular order in the seat member or face of a collar that is non-rotatably supported in conjunction with the threaded end of the bolt upon which the nut is employed. The conical pointed pin carried by the nut engages with the recesses in the collar or seat member in such manner that the pin will automatically retract and advance for self-locking, so that the nut can be readily turned or adjusted in either direction by means of an ordinary wrench without regard to the pin, but will remain engaged against self-displacement or working loose when at any adjusted position.

Referring to the drawings, B indicates the threaded bolt, which, as herein shown, represents a draft-rod or clamping-bolt of the kind employed in friction-clutches and similar mechanism for drawing the movable clutch-plates or friction clamping-disks together and releasing the same, action thereon being effected by well-known means, such as an actuator-lever or cam member (not shown) combined with the head *b* of the bolt, which is suitably formed for connection therewith of the actuator means and whereby as the clutch is operated the nut is subjected to continually varying pressures that would naturally tend to loosen any check-nuts if employed under such conditions.

A indicates a portion of one of the movable clutch-plates or clamp-disks with which the bolt is used.

The threaded portion 2 of the bolt or rod is provided with a longitudinal groove 3 along one side thereof. C indicates a collar or seat member arranged to slide thereon having an internal projection, lug, or means 13, that engages with said groove for preventing rotation of the collar C about the bolt.

D indicates the nut, which is provided at one side with a counterbored hole 4, extending through its body approximately parallel with the main axis. Within said hole there is an endwise-movable pin 15, having a head formed with a back shoulder and a conical point 5. Said pin is arranged in the hole with only its conical end or point projecting from the bearing-face of the nut. An expanding coiled-wire spring 10 is arranged within the hole to press against a shoulder on the nut and a shoulder on the pin and tending to normally project the end of the pin. The outer end of the pin 15 is upset or riveted above the top of the nut, forming a slight flange or arresting-bur 9 (see Figs. 4 and 6) sufficient to prevent its withdrawal by the force of the spring 10, but in a manner that will allow the pin to slide freely endwise and to arrest its movement when the end 5 is at proper engaging position.

The nut-seating face 7 is provided with a series or plurality of separate conical recesses 6, arranged in a circle around the central opening 8 and at proper distance from the axis for receiving the point 5 of the lockingpin. Said recesses are positioned to correspond with the radials of the several angles of the nut, and the pin can engage either of the recesses, thus giving six different adjustments for each revolution of the nut. The thread 2 of the bolt is preferably made with a pitch of twelve to the inch. Hence each adjustment of the nut effects an alteration in the closure of the clamp devices of one seventy-second of an inch. The seat member C is illustrated as having a spherical under surface, so as to permit more or less rocking action of the bolt B; but in some instances the seat-surface 7 may be formed directly upon the plate or upon a seat member without a spheroidal surface.

When the nut is turned, which can be done at any time with an ordinary wrench, the conicality of the point 5 causes the pin to automatically lift from the recess 6 in opposition to the spring-pressure, and the spring causes the pin to automatically drop into any recess when brought into alinement therewith. The projection of the end of the pin above the nut, as at 25, when the point is against the seat-face 7 between two recesses and its drop when a recess is present serves to visibly indicate to the operator whether the locking parts are at engaging or non-engaging positions and to show the nature and extent of the adjustment, so that the several nuts for the entire series of draft-bolts employed in a frictional clutch mechanism can be accurately and similarly adjusted, while automatic release and retention of the adjusting-nuts at any of their several predetermined adjustment positions is practically and successfully accomplished.

In some instances the yieldable stud or pin can be arranged in the seat member and the recesses in the face of the nut, the conoidal surfaces engaging across the plane of the seating-surface, so that the stud yieldingly retracts by the lateral pressure applied thereto when the nut is turned either right or left by a wrench in the manner as above described.

What I claim, and desire to secure by Letters Patent, is—

1. The means for effecting and retaining adjustment of clutch-actuating draft-bolts, comprising the combination as described, with the movable clutch-plate, the threaded clutch-actuating draft-bolt having a head for connection of actuator means thereto, and a threaded end, the adjusting-nut threaded thereon, a yielding spring-pressed stud arranged in an opening through one side of the nut, parallel with the axis thereof, and having a projecting conical point, a non-rotatable nut-bearing seat provided with a series of cone-fitting openings therein, positioned at radial intervals that correspond with angles of the nut, substantially as set forth.

2. In combination with a draft-bolt in a clutch mechanism, and the clamp-disk controlled thereby, a non-rotatable rockable nut-supporting member having a flat nut-bearing seat and a rounded bed-surface, the adjusting-nut threaded on said draft-bolt, and a self-acting adjustment-retaining means consisting of a spring-pressed yieldable conical-pointed stud, disposed approximately parallel with the main axis, near the edge of the nut-seating surface with its conical point projecting therefrom, and counter-matching cone-receiving recesses engageable at the adjacent bearing-faces by coned surfaces that effect retraction of the stud by forced lateral movement of the nut in either direction, as and for the purpose set forth.

3. The combination, with the clutch-draft bolt, the adjusting-nut thereon provided with an endwise-movable pin having a conical end projectable from the bearing-face of the nut, and an arresting-bur at its opposite end, and a spring for projecting said pin; of a non-rotatable seat member having a rounded bed-surface, and a flat nut-bearing surface provided with circular cone-fitting cavities arranged therein at regular intervals corresponding with the hexagonal divisions of the nut and adapted for respectively engaging the conical end of said pin as the respective sides of the nut are brought to a predetermined position, and for automatic release thereof as the nut is turned from such position.

Witness my hand this 7th day of May, 1906.

MICHAEL F. McMAHON.

Witnesses:
CHAS. H. BURLEIGH,
FRED H. FLINN.